US012292165B1

(12) United States Patent
Lu et al.

(10) Patent No.: US 12,292,165 B1
(45) Date of Patent: May 6, 2025

(54) LIGHT TUBE HAVING ROTATABLE END CAPS

(71) Applicant: Xiamen PVTECH Co., Ltd., Fujian (CN)

(72) Inventors: Fuxing Lu, Fujian (CN); Weibiao Zhong, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/665,580

(22) Filed: May 16, 2024

(30) Foreign Application Priority Data

Dec. 29, 2023 (CN) ......................... 202311871957.9

(51) Int. Cl.

| | |
|---|---|
| ***F21K 9/272*** | (2016.01) |
| ***F21V 14/02*** | (2006.01) |
| ***F21V 19/00*** | (2006.01) |
| ***F21V 19/02*** | (2006.01) |
| *F21Y 115/10* | (2016.01) |

(52) U.S. Cl.
CPC .............. *F21K 9/272* (2016.08); *F21V 14/02* (2013.01); *F21V 19/008* (2013.01); *F21V 19/02* (2013.01); *F21Y 2115/10* (2016.08)

(58) Field of Classification Search
CPC ........ F21K 9/272; F21V 14/02; F21V 19/008; F21V 19/02; F21Y 2115/10
See application file for complete search history.

(56) References Cited

U.S. PATENT DOCUMENTS 8,928,025 B2 * 1/2015 Simon ........................ F21K 9/65 257/E33.058
2011/0194296 A1 * 8/2011 Chou ...................... F21K 9/272 362/362
2014/0009925 A1 * 1/2014 Verhoeven .............. F21V 25/00 362/221
2016/0123543 A1 * 5/2016 He ............................ F21K 9/65 362/221
2016/0290606 A1 * 10/2016 Honold ................. F21V 15/015
2019/0063690 A1 * 2/2019 Eckert ................... F21V 23/006
2019/0338897 A1 * 11/2019 Brown .................... F21K 9/272

* cited by examiner

*Primary Examiner* — Tsion Tumebo
(74) *Attorney, Agent, or Firm* — Winston Hsu

(57) ABSTRACT

A light tube having rotatable end caps includes a tube body, two positioning connectors and two rotatable end caps. The two positioning connectors are disposed at the two ends of the tube body respectively. Each of the positioning connectors includes a base and a cylindrical body disposed on the base. The base is provided with a waved positioning structure between the outer edge of the base and the outer surface of the cylindrical body. The two rotatable end caps are disposed at the two positioning connectors respectively. Each of the rotational end caps is rotatably connected to the cylindrical body of the positioning connector corresponding thereto. Each of the rotatable end caps has an elastic element corresponding to the waved positioning structure and engaged with the wave structure.

5 Claims, 6 Drawing Sheets

LIGHT TUBE HAVING ROTATABLE END CAPS

BACKGROUND OF THE INVENTION

1. Field of the Invention

The present invention relates to a light tube, in particular to a light tube having rotatable end caps.

2. Description of the Prior Art

Due to technological advancements, the efficiency of light-emitting diode (LED) light tubes has been significant improved. LED light tubes have a lot of advantages, such as energy savings, long service life, and high efficiency. However, currently available LED light tubes still have several shortcomings that require further refinement. For instance, users often need to repeatedly adjust the light-emitting angle of LED light tubes. Nevertheless, current available LED light tubes lack suitable angle adjustment mechanisms, so it is inconvenient for users to adjust the light-emitting angle easily. This increases the complexity of installation and results in significant inconvenience in usage.

SUMMARY OF THE INVENTION

One embodiment of the present invention provides a light tube having rotatable end caps, which includes a tube body, two positioning connectors and two rotatable end caps. The two positioning connectors are disposed at the two ends of the tube body respectively. Each of the positioning connectors includes a base and a cylindrical body disposed on the base. The base is provided with a waved positioning structure between the outer edge of the base and the outer surface of the cylindrical body. The two rotatable end caps are disposed at the two positioning connectors respectively. Each of the rotational end caps is rotatably connected to the cylindrical body of the positioning connector corresponding thereto. Each of the rotatable end caps has an elastic element corresponding to the waved positioning structure and engaged with the wave structure.

In one embodiment, the waved positioning structure has a plurality of concave portions and a plurality of convex portions. The concave portions and the convex portions are alternately arranged.

In one embodiment, the curvature of the concave portions is greater than the curvature of the convex portions.

In one embodiment, the curvature of the convex portions is 70% to 90% of the curvature of the concave portions.

In one embodiment, one end of the elastic element is fixed to the bottom of the rotatable end cap, and another end of the elastic element has a curved surface embedded in one of the concave portions. The curvature of the curved surface is less than the curvature of the concave portions.

In one embodiment, the curvature of the curved surface is 80% to 95% of the curvature of the concave portions.

In one embodiment, each positioning connector further includes an inner ring disposed on the inner surface of the cylindrical body of the positioning connector.

In one embodiment, each rotatable end cap has a plurality of hook portions. The hook portions are rotatably engaged with the inner ring of the positioning connector corresponding thereto.

In one embodiment, each of the rotatable end caps has an electrical connection portion. The electrical connection portion includes an outer wall and two conductive elements, and the two conductive elements are disposed inside the outer wall.

In one embodiment, the outer wall has a positioning opening.

The light tube having rotatable end caps in accordance with the embodiments of the present invention may have the following advantages:

(1) In one embodiment of the present invention, a light tube includes a tube body, two positioning connectors and two rotatable end caps. The two positioning connectors are disposed at the two ends of the tube body respectively. Each of the positioning connectors includes a base and a cylindrical body disposed on the base. The base is provided with a waved positioning structure between the outer edge of the base and the outer surface of the cylindrical body. The two rotatable end caps are disposed at the two positioning connectors respectively. Each of the rotational end caps is rotatably connected to the cylindrical body of the positioning connector corresponding thereto. Each of the rotatable end caps has an elastic element corresponding to the waved positioning structure and engaged with the wave structure. As set forth above, the light tube has the specially-designed rotatable end caps, so the user can conveniently adjust the light-emitting angle without removing the light tube from the frame. Therefore, the structural design of the light tube effectively reduces the complexity of installation, so the light tube can be more convenient in use and the time cost of installation thereof can be reduced.

(2) In one embodiment of the present invention, the light tube has the specially-designed rotatable end caps, which can be integrated with the waved positioning structure. The elastic element of the rotatable end cap is corresponding to the waved positioning structure, which has a plurality of concave and convex portions, and the curved surface of the elastic element can be embedded in one of the concave portions. With the design of the waved positioning structure, users can fine-tune the light-emitting angle of the light tube so as to optimize the lighting effect.

(3) In one embodiment of the present invention, the light tube has the specially-designed rotatable end caps, which can be integrated with the waved positioning structure. The concave and convex portions of the waved positioning structure are alternately arranged. The curvature of the concave portions is greater than that of the convex portions, which can effectively make the elastic element of the rotatable end cap be fixed in one of the concave portions. When the user rotates the rotatable end cap, the convex portions can provide great guiding effect, so the user can easily rotate the end cap. This structural design optimizes the positioning effect and ease of operation of the waved positioning structure. Therefore, the design of the rotatable end caps on the light tube can better meet actual requirements.

(4) In one embodiment of the present invention, one end of the elastic element of the rotatable end cap is fixed on the bottom of the end cap, and the other end of the elastic element has a curved surface. The curved surface is embedded in one of the concave portions, and the curvature of the curved surface is less than that of the concave portions. This design stabilizes the engagement between the elastic element and the concave portion in order to enhance the positioning effect of the waved positioning structure.

(5) In one embodiment of the present invention, the elastic element of the rotatable end cap can be made of a flexible material. Therefore, the elastic element not only provides a positioning effect but also serves damping element, such that the waved positioning structure can achieve the desired technical effects.

(6) In one embodiment of the present invention, the structural design of the light tube with rotatable end caps is simple, so the light tube can achieve desired technical effects without significantly increasing the cost thereof. Therefore, the practicality of the light tube can be greatly enhanced in order to meet the requirements of different applications.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
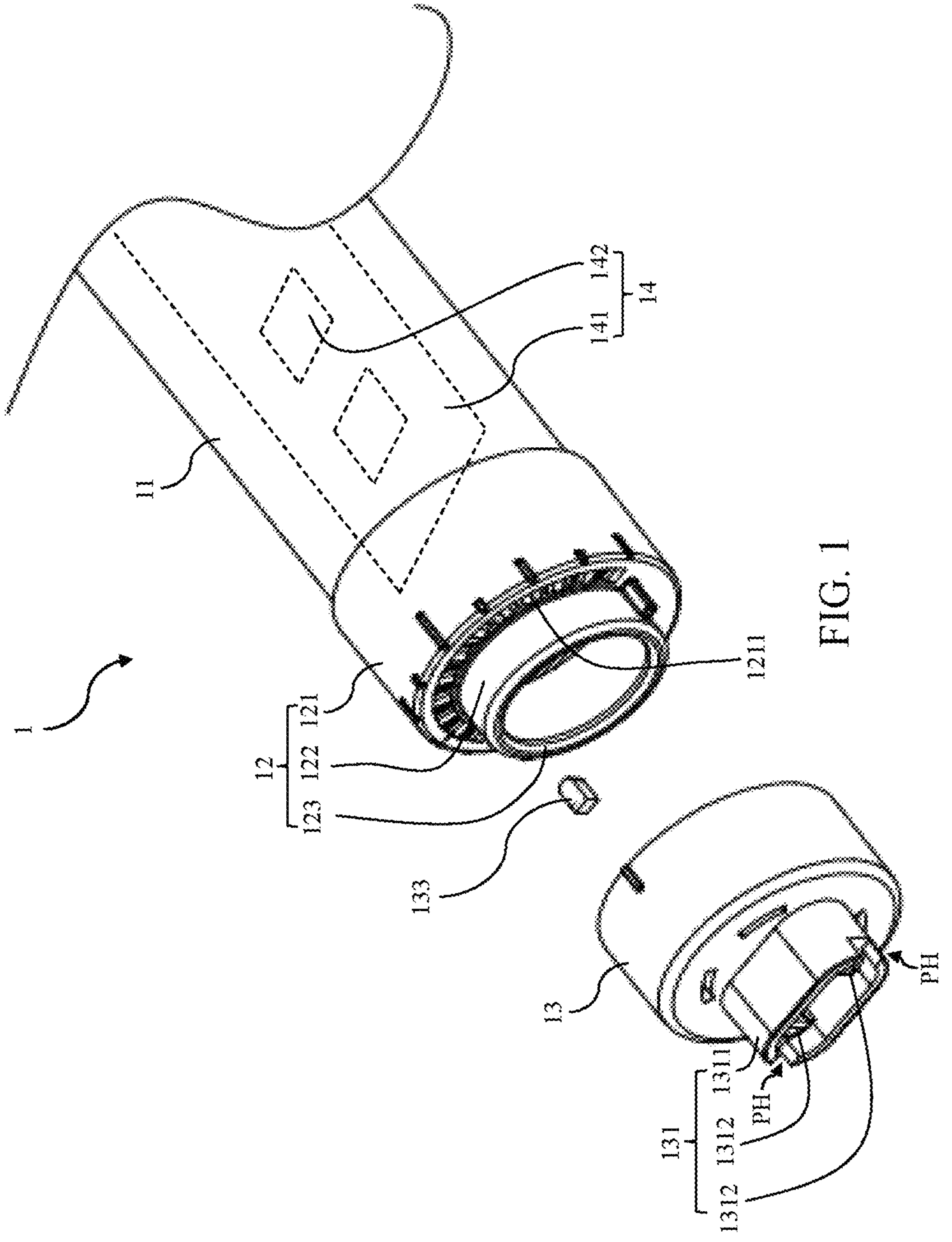
FIG. 1 is a first schematic view of a structure of a light tube having rotatable end caps in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
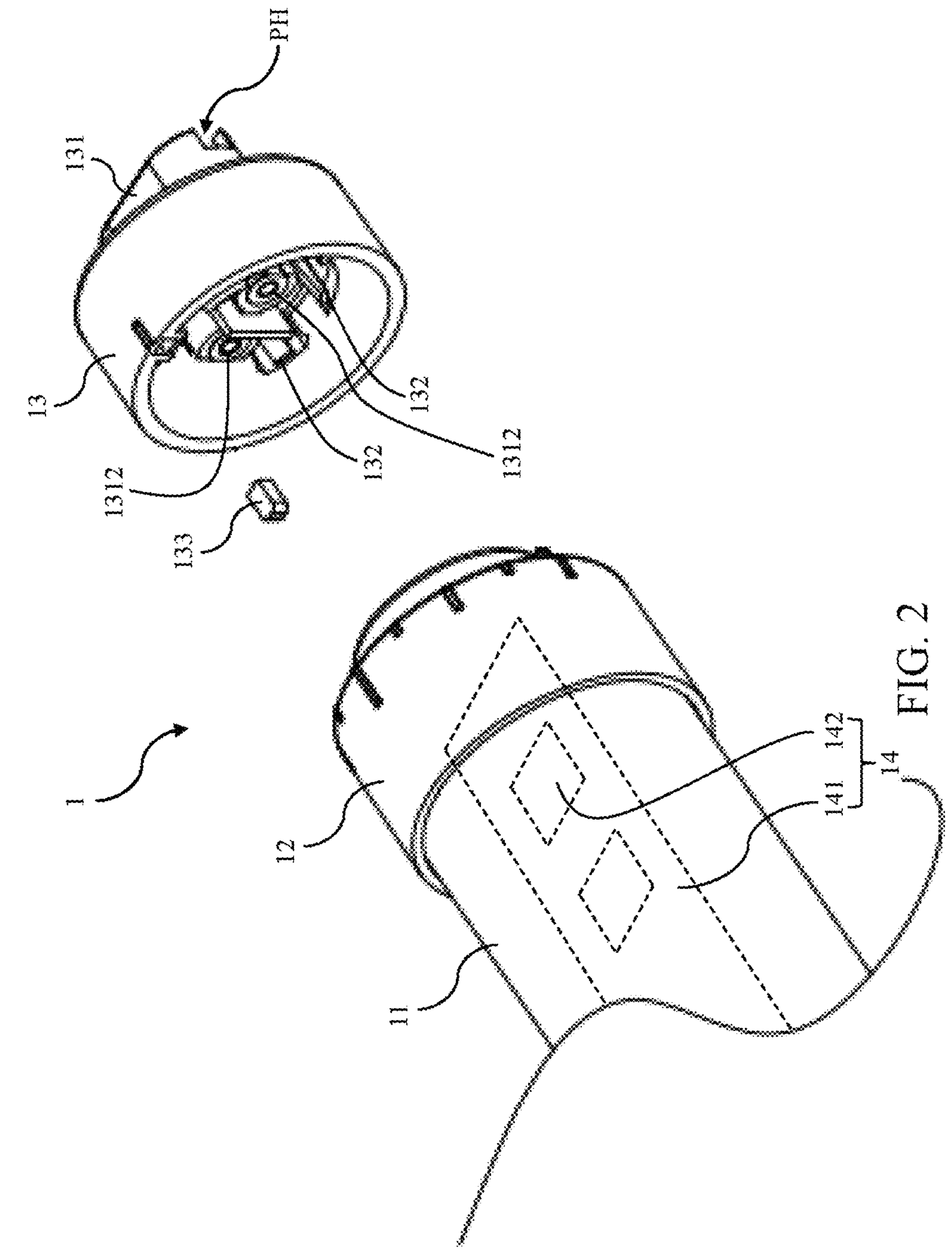
FIG. 2 is a second schematic view of the structure of the light tube having rotatable end caps in accordance with one embodiment of the present invention.
Figure 3:
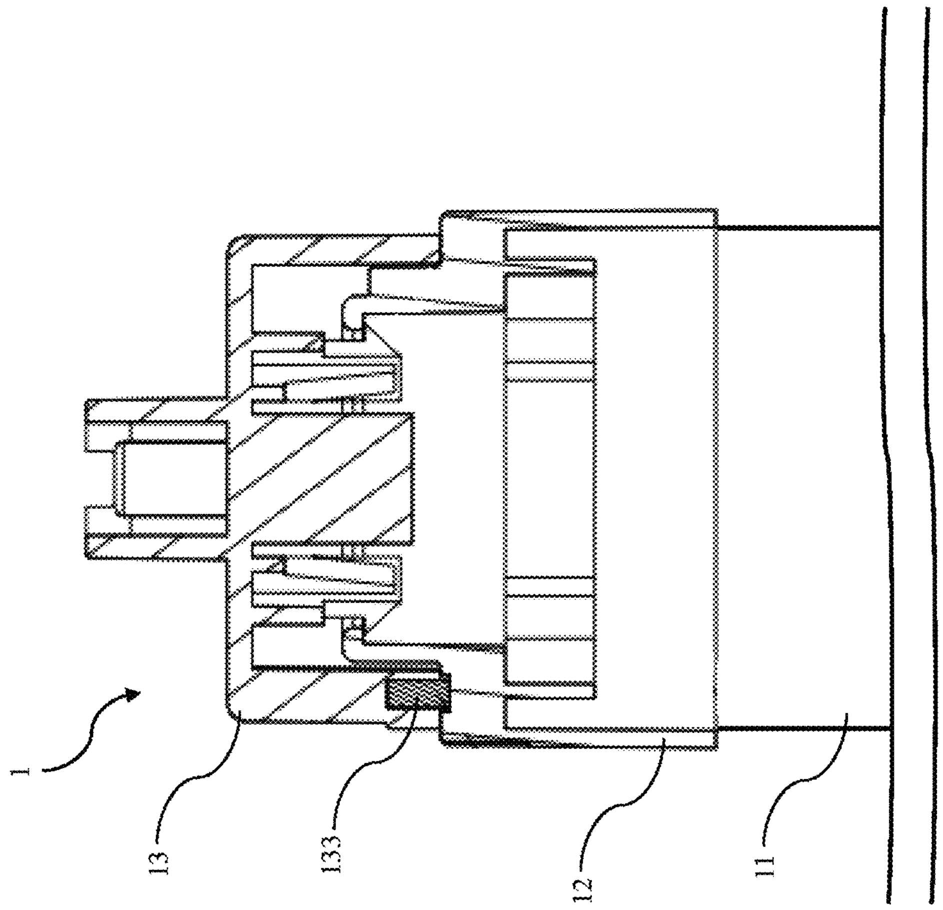
FIG. 3 is a sectional view of the structure of the light tube having rotatable end caps in accordance with one embodiment of the present invention.

Please refer to FIG. 1, FIG. 2 and FIG. 3. FIG. 1 is a first schematic view of a structure of a light tube having rotatable end caps in accordance with one embodiment of the present invention. FIG. 2 is a second schematic view of the structure of the light tube having rotatable end caps in accordance with one embodiment of the present invention. FIG. 3 is a sectional view of the structure of the light tube having rotatable end caps in accordance with one embodiment of the present invention. As shown in FIG. 1, FIG. 2 and FIG. 3, the light tube 1 includes a tube body 11, two positioning connectors 12, two rotatable end caps 13, and a light source board 14.

The light source board 14 is disposed in the tube body 11 and includes a circuit board 141 and a plurality of light sources 142. In this embodiment, the light sources 142 can be light-emitting diodes (LEDs). In another embodiment, the light sources 142 can be a LED array or other similar structures.

The two positioning connectors 12 (only one shown in the figures) are respectively disposed at the two ends of the tube body 11. Each of the positioning connectors 12 includes a base 121, a cylindrical body 122, and an inner ring 123. The cylindrical body 122 is disposed on the base 121, and the inner ring 123 is disposed on the inner surface of the cylindrical body 122. The outer edge of the base 121 and the outer surface of the cylindrical body 122 is provided with a waved positioning structure 1211.

The two rotatable end caps 13 are respectively disposed on the two positioning connectors 12. Each of the rotatable end caps 13 has a plurality of hook portions 132, an electrical connection portion 131, and an elastic element 133. The hook portions 132 can be rotatably engaged with the inner ring 123 of the corresponding positioning connector 12, such that the rotatable end cap 13 can be rotatably connected to the cylindrical body 122 of the corresponding positioning connector 12. In this embodiment, the number of hook portions 132 can be two. In another embodiment, the number of hook portions 132 can be one or more than three, depending on actual requirements. Each of the electrical connection portions 131 includes an outer wall 1311 and two conductive elements 1312. The two conductive elements 1312 are disposed inside the outer wall 1311 and electrically connected to the light source board 14. The outer wall 1311 has a plurality of positioning openings PH. In this embodiment, the outer wall 1311 can have two positioning openings PH. In another embodiment, the number of positioning openings PH can be one or more than three, depending on actual requirements. In one embodiment, the two conductive elements 1312 can be copper pins or made of other metal materials. The bottom of each rotatable end cap 13 has an elastic element 133. The elastic element 133 is corresponding to the waved positioning structure 1211 and is mutually engaged with the waved positioning structure 1211. In one embodiment, the material of the elastic element 133 is rubber. In another embodiment, the material of the elastic element 133 can be plastic or other similar materials.

As described above, the light tube 1 has the specially-designed rotatable end caps 13, so the user can conveniently adjust the light-emitting angle without removing the light tube 1 from the frame. Therefore, the structural design of the light tube 1 effectively reduces the complexity of installation, so the light tube 1 can be convenient in use and the time cost of installation thereof can be decreased.

The embodiment just exemplifies the present invention and is not intended to limit the scope of the present invention; any equivalent modification and variation according to the spirit of the present invention is to be also included within the scope of the following claims and their equivalents.

Figure 4A:
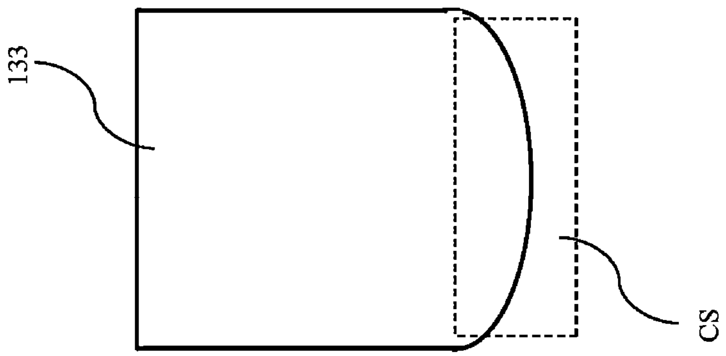
FIG. 4A is a schematic view of an elastic element of the light tube having rotatable end caps in accordance with one embodiment of the present invention.
Figure 4B:
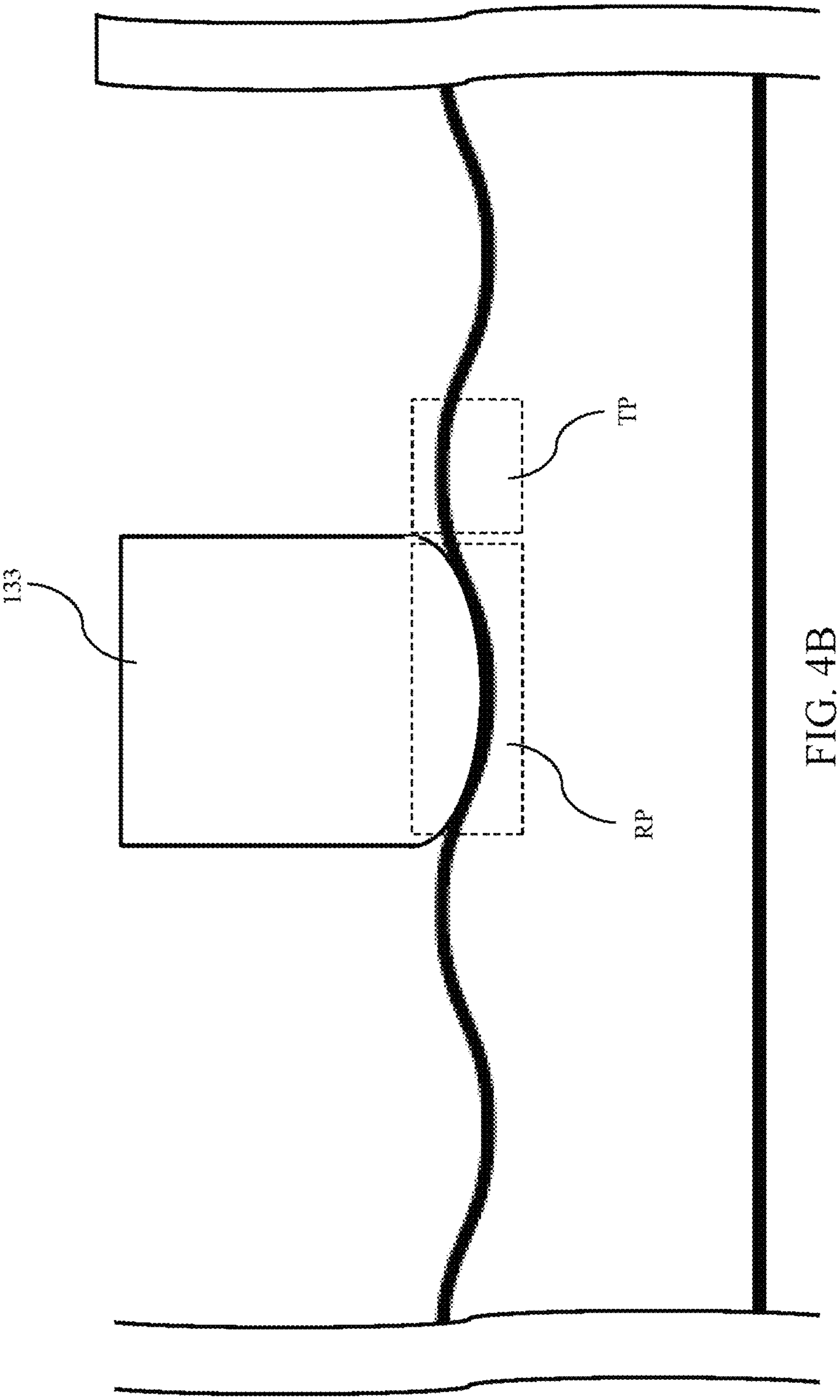
FIG. 4B is a schematic view of a waved positioning structure and the elastic element of the light tube having rotatable end caps in accordance with one embodiment of the present invention.

Please refer to FIG. 4A and FIG. 4B. FIG. 4A is a schematic view of an elastic element of the light tube having rotatable end caps in accordance with one embodiment of the present invention. FIG. 4B is a schematic view of a waved positioning structure and the elastic element of the light tube having rotatable end caps in accordance with one embodiment of the present invention. As shown in FIG. 4A and FIG. 4B, the waved positioning structure 1211 has a plurality of concave portions RP and a plurality of convex portions TP. The concave portions RP and convex portions TP are alternately arranged. That is to say, each concave portion RP is disposed between two convex portions TP, and each convex portion TP is disposed between two concave portions RP. The curvature of the concave portions RP is greater than the curvature of the convex portions TP. In one embodiment, the curvature of the convex portions TP is 70% to 90% of the curvature of the concave portions RP. In another embodiment, the curvature of the convex portions TP is 75% to 85% of the curvature of the concave portions RP.

One end of the elastic element 133 is fixed on the bottom of the rotatable end cap 13. The other end of the elastic element 133 has a curved surface CS. The curved surface CS is embedded in one of the concave portions RP. The curvature of the curved surface CS can be smaller than the curvature of the concave portions RP. In one embodiment, the curvature of the curved surface CS is 80% to 95% of the curvature of the concave portions RP. In another embodiment, the curvature of the curved surface CS is 85% to 90% of the curvature of the concave portions RP.

As set forth above, the light tube 1 has the specially-designed rotatable end caps 13, which can be integrated with the waved positioning structure 1211. The elastic element 133 of the rotatable end cap 13 is corresponding to the waved positioning structure 1211. The waved positioning structure 1211 has the concave portions RP and convex portions TP, and the curved surface CS of the elastic element 133 can be embedded in one of the concave portions RP. With the design of the waved positioning structure 1211, the user can fine-tune the light-emitting angle of the light tube 1 to optimize the lighting effect thereof.

Moreover, as described above, the concave portions RP and convex portions TP of the waved positioning structure 1211 are alternately arranged, and the curvature of the concave portions RP is greater than the curvature of the convex portions TP (e.g., the curvature of the convex portions is 70% to 90% of the curvature of the concave portions). Additionally, the curvature of the curved surface CS of the elastic element 133 can be less than the curvature of the concave portions RP (e.g., the curvature of the curved surface is 80% to 95% of the curvature of the concave portions). Through these structural designs, the concave portions RP can effectively secure the elastic element 133 of the rotatable end cap 13. Simultaneously, when the user rotates the rotatable end cap 13, the convex portions TP can provide great guiding effect, such that the user can easily rotate the end cap 13. This structural design significantly optimizes the positioning effect and ease of operation of the waved positioning structure 1211.

Furthermore, one end of the elastic element 133 of the rotatable end cap 13 is fixed on the bottom of the rotatable end cap 13, and the other end of the elastic element 133 has the curved surface CS. The curved surface CS is embedded in one of the concave portions RP, and the curvature of the curved surface CS is less than the curvature of the concave portions RP. This structural design makes the elastic element 133 be more stably engaged with the concave portions RP with a view to enhancing the positioning effect of the waved positioning structure 1211. Therefore, the structural design of the rotatable end cap 13 of the light tube 1 can meet actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that currently available LED light tubes still have several shortcomings that require further refinement. For instance, users often need to repeatedly adjust the light-emitting angle of LED light tubes. Nevertheless, current available LED light tubes lack suitable angle adjustment mechanisms, so it is inconvenient for users to adjust the light-emitting angle easily. This increases the complexity of installation and results in significant inconvenience in usage. By contrast, according to one embodiment of the present invention, a light tube includes a tube body, two positioning connectors and two rotatable end caps. The two positioning connectors are disposed at the two ends of the tube body respectively. Each of the positioning connectors includes a base and a cylindrical body disposed on the base. The base is provided with a waved positioning structure between the outer edge of the base and the outer surface of the cylindrical body. The two rotatable end caps are disposed at the two positioning connectors respectively. Each of the rotational end caps is rotatably connected to the cylindrical body of the positioning connector corresponding thereto. Each of the rotatable end caps has an elastic element corresponding to the waved positioning structure and engaged with the wave structure. As set forth above, the light tube has the specially-designed rotatable end caps, so the user can conveniently adjust the light-emitting angle without removing the light tube from the frame. Therefore, the structural design of the light tube effectively reduces the complexity of installation, so the light tube can be more convenient in use and the time cost of installation thereof can be reduced.

According to one embodiment of the present invention, the light tube has the specially-designed rotatable end caps, which can be integrated with the waved positioning structure. The elastic element of the rotatable end cap is corresponding to the waved positioning structure, which has a plurality of concave and convex portions, and the curved surface of the elastic element can be embedded in one of the concave portions. With the design of the waved positioning structure, users can fine-tune the light-emitting angle of the light tube so as to optimize the lighting effect.

Also, according to one embodiment of the present invention, the light tube has the specially-designed rotatable end caps, which can be integrated with the waved positioning structure. The concave and convex portions of the waved positioning structure are alternately arranged. The curvature of the concave portions is greater than that of the convex portions, which can effectively make the elastic element of the rotatable end cap be fixed in one of the concave portions. When the user rotates the rotatable end cap, the convex portions can provide great guiding effect, so the user can easily rotate the end cap. This structural design optimizes the positioning effect and ease of operation of the waved positioning structure. Therefore, the design of the rotatable end caps on the light tube can better meet actual requirements.

Further, according to one embodiment of the present invention, one end of the elastic element of the rotatable end cap is fixed on the bottom of the end cap, and the other end of the elastic element has a curved surface. The curved surface is embedded in one of the concave portions, and the curvature of the curved surface is less than that of the concave portions. This design stabilizes the engagement between the elastic element and the concave portion in order to enhance the positioning effect of the waved positioning structure.

Moreover, according to one embodiment of the present invention, the elastic element of the rotatable end cap can be made of a flexible material. Therefore, the elastic element not only provides a positioning effect but also serves as a damping element, such that the waved positioning structure can achieve the desired technical effects.

Furthermore, according to one embodiment of the present invention, the structural design of the light tube with rotatable end caps is simple, so the light tube can achieve desired technical effects without significantly increasing the cost thereof. Therefore, the practicality of the light tube can be greatly enhanced in order to meet the requirements of different applications. As previously stated, the light tube according to the embodiments of the present invention can definitely achieve great technical effects.

Figure 5:
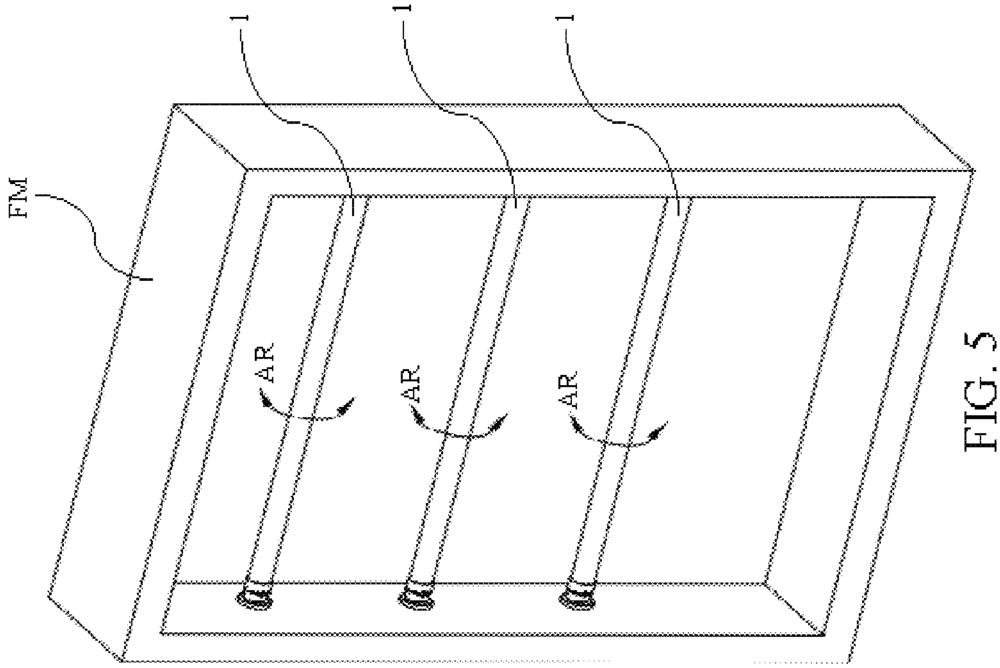
FIG. 5 is a schematic view of a usage state of the light tube having rotatable end caps in accordance with one embodiment of the present invention.

Please refer to FIG. 5, which is a schematic view of a usage state of the light tube having rotatable end caps in accordance with one embodiment of the present invention. Please also refer to FIG. 1~FIG. 3. As shown in FIG. 5, the light tube 1 can be fixed on the frame FM. The user can rotate the light tube 1 in either the clockwise or counter-clockwise direction (as indicated by the arrow AR in FIG. 5) to adjust the light-emitting angle of the light tube 1 without removing the light tube 1 from the frame FM.

As previously stated, the light tube 1 has the specially-designed rotatable end cap 13, so the user can conveniently adjust the light-emitting angle without removing the light tube 1 from the frame FM. Therefore, the structural design of the light tube 1 effectively reduces the complexity of installation, so the light tube 1 can be more convenient in use and the time cost of installation thereof can be decreased.

Furthermore, the light tube 1 has the specially-designed rotatable end cap 13, which can be integrated with the waved positioning structure 1211. The elastic element 133 of the rotatable end cap 13 is corresponding to the waved positioning structure 1211. The waved positioning structure 1211 has the concave portions RP and convex portions TP, and the curved surface CS of the elastic element 133 can be embedded in one of the concave portions RP. Via the design of the waved positioning structure 1211, the user can fine-tune the light-emitting angle of the light tube 1 in order to optimize the lighting effect thereof.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, a light tube includes a tube body, two positioning connectors and two rotatable end caps. The two positioning connectors are disposed at the two ends of the tube body respectively. Each of the positioning connectors includes a base and a cylindrical body disposed on the base. The base is provided with a waved positioning structure between the outer edge of the base and the outer surface of the cylindrical body. The two rotatable end caps are disposed at the two positioning connectors respectively. Each of the rotational end caps is rotatably connected to the cylindrical body of the positioning connector corresponding thereto. Each of the rotatable end caps has an elastic element corresponding to the waved positioning structure and engaged with the wave structure. As set forth above, the light tube has the specially-designed rotatable end caps, so the user can conveniently adjust the light-emitting angle without removing the light tube from the frame. Therefore, the structural design of the light tube effectively reduces the complexity of installation, so the light tube can be more convenient in use and the time cost of installation thereof can be reduced.

According to one embodiment of the present invention, the light tube has the specially-designed rotatable end caps, which can be integrated with the waved positioning structure. The elastic element of the rotatable end cap is corresponding to the waved positioning structure, which has a plurality of concave and convex portions, and the curved surface of the elastic element can be embedded in one of the concave portions. With the design of the waved positioning structure, users can fine-tune the light-emitting angle of the light tube so as to optimize the lighting effect.

Also, according to one embodiment of the present invention, the light tube has the specially-designed rotatable end caps, which can be integrated with the waved positioning structure. The concave and convex portions of the waved positioning structure are alternately arranged. The curvature of the concave portions is greater than that of the convex portions, which can effectively make the elastic element of the rotatable end cap be fixed in one of the concave portions. When the user rotates the rotatable end cap, the convex portions can provide great guiding effect, so the user can easily rotate the end cap. This structural design optimizes the positioning effect and ease of operation of the waved positioning structure. Therefore, the design of the rotatable end caps on the light tube can better meet actual requirements.

Further, according to one embodiment of the present invention, one end of the elastic element of the rotatable end cap is fixed on the bottom of the end cap, and the other end of the elastic element has a curved surface. The curved surface is embedded in one of the concave portions, and the curvature of the curved surface is less than that of the concave portions. This design stabilizes the engagement between the elastic element and the concave portion in order to enhance the positioning effect of the waved positioning structure.

Moreover, according to one embodiment of the present invention, the elastic element of the rotatable end cap can be made of a flexible material. Therefore, the elastic element not only provides a positioning effect but also serves as a damping element, such that the waved positioning structure can achieve the desired technical effects.

Furthermore, according to one embodiment of the present invention, the structural design of the light tube with rotatable end caps is simple, so the light tube can achieve desired technical effects without significantly increasing the cost thereof. Therefore, the practicality of the light tube can be greatly enhanced in order to meet the requirements of different applications.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light tube having rotatable end caps, comprising:

a tube body;

two positioning connectors disposed at two ends of the tube body respectively, wherein each of the positioning connectors comprises a base and a cylindrical body disposed on the base, and the base is provided with a waved positioning structure between an outer edge of the base and an outer surface of the cylindrical body, wherein the waved positioning structure has a plurality of concave portions and a plurality of convex portions, and the concave portions and the convex portions are alternately arranged, and a curvature of the convex portions is 70% to 90% of a curvature of the concave portions; and two rotatable end caps disposed at the two positioning connectors respectively, wherein each of the rotational end caps is rotatably connected to the cylindrical body of the positioning connector corresponding thereto, wherein each of the rotatable end caps has an elastic element corresponding to the waved positioning structure and engaged with the wave structure, wherein one end of the elastic element is fixed to a bottom of the rotatable end cap, and another end of the elastic element has a curved surface embedded in one of the concave portions, wherein a curvature of the curved surface is 80% to 95% of the curvature of the concave portions.

2. The light tube with rotatable end caps as claimed in claim 1, wherein each positioning connector further comprises an inner ring disposed on an inner surface of the cylindrical body of the positioning connector.

3. The light tube with rotatable end caps as claimed in claim 2, wherein each rotatable end cap has a plurality of hook portions, and the hook portions are rotatably engaged with the inner ring of the positioning connector corresponding thereto.

4. The light tube with rotatable end caps as claimed in claim 1, wherein each of the rotatable end caps has an electrical connection portion, and the electrical connection portion comprises an outer wall and two conductive elements, and the two conductive elements are disposed inside the outer wall.

5. The light tube with rotatable end caps as claimed in claim 4, wherein the outer wall has a positioning opening.

* * * * *